United States Patent [19]
D'Avino

[11] 3,745,457
[45] July 10, 1973

[54] PHASE METERS FOR THE INDIRECT MEASUREMENT OF POWER FACTOR

[76] Inventor: Salvatore D'Avino, c/o Dr. Ing. Misitano A.G., via Padova, 217, 20127 Milan, Italy

[22] Filed: Oct. 8, 1971

[21] Appl. No.: 187,776

[52] U.S. Cl. ............................ 324/83 R, 235/70 A
[51] Int. Cl. ........................ G01n 25/00, G06g 1/00
[58] Field of Search .................. 324/83 R, 83 A, 90; 235/70 A, 61 B

[56] References Cited
UNITED STATES PATENTS
2,583,798  1/1952  Rowell et al. .................... 324/90 X
3,128,944  4/1964  Gabriel ............................ 235/61 B

*Primary Examiner*—Alfred E. Smith

[57] ABSTRACT

The angle phase meter comprises a capacitor with a discharge resistor, an ammeter for measuring the current taken by the said capacitor, and the current taken by the load, and the current taken by the load and said capacitor when connected in parallel, a rule provided with a goniometric scale, two graduated hands independently pivoted at the centre of the goniometric scale and each provided with a slider indicating the corresponding graduation on the hand, a graduated listel provided with a slider and cooperating with the sliders of the said graduated hands, whereby the plotting by means of the listel and corresponding sliders the current taken by the load in the slider of one hand, the current taken by the load and capacitor in the slider of the other hand, and the current taken by the capacitor in the said listel by means of the listel slider, and swinging the hand and listel so that the listel is parallel to the goniometric base, the hand on which the current load is plotted will indicate the phase angle on the said goniometric scale.

2 Claims, 6 Drawing Figures

PATENTED JUL 10 1973

3,745,457

INVENTOR

Salvatore D'Simo

3,745,457

PHASE METERS FOR THE INDIRECT MEASUREMENT OF POWER FACTOR

This invention relates to phase meters for the indirect measurement of the power factor.

The direct measurement of the power factor can be carried out by means of an electrodynamic phase meter. For the indirect measurement of the power factor, three separate instruments, namely a wattmeter, a voltmeter and an ammeter, are necessary. Electrodynamic phase meters are complicated and expensive and the measurement, limited to the power factor only, is subject to errors. The classic indirect measurement by means of a voltmeter, wattmeter and ammeter is rather long.

An object of this invention is to eliminate or at any rate to lessen the above mentioned drawbacks.

According to this invention there is provided a phase meter for the indirect measurement of the power factor characterized by the fact that it comprises a capacitor with a discharge resistor, an ammeter for measuring the current taken by the said capacitor, and the current taken by the load and the current taken by the load and said capacitor when connected in parallel, a rule provided with a goniometric scale, two graduated hands independently pivoted at the centre of the goniometric scale and each provided with a slider indicating the corresponding graduation on the hand, a graduated listel provided with a slider and cooperating with the sliders of the said graduated hands, whereby by plotting by means of the listel and corresponding sliders the current taken by the load in the slider of one hand, the current taken by the load and capacitor in the slider of the other hand, and the current taken by the capacitor in the said listel by means of the listel slider, and swinging the hands and listel so that the listel is parallel to the goniometric base, the hand on which the current load is plotted will indicate the phase angle on the said goniometric scale.

In one modified form of phase angle meter according to the invention, the capacitor is replaced by a purely ohmic resistor; in this instance the current taken by the resistor will be plotted in the listel and the reading will be given by the load current hand when the listel is positioned perpendicular to the goniometric base.

The above features and others will appear from the following description of a preferred embodiment of the invention, reference being made to the accompanying drawings in which.

Figure 1:
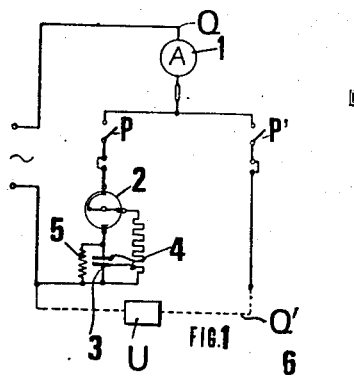
FIG. 1 shows the connections of a phase meter according to the invention.

Referring to FIG. 1, a capacitor 4 provided with a discharge resistor 5 may be connected (see two-way switch 2 and switch P) in the line Q, in which an ammeter 1 is connected. The reference Q' indicates the line which includes the load U, a further switch P' providing the connection of the load U only to the line Q.

Figures 2, 3:
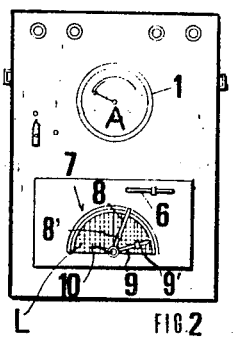
FIG. 2 is an elevational view of the phase meter according to FIG. 1.
FIG. 3 is a longitudinal side view of the listel by which the current taken by the capacitor and the current taken by the resistor are transferred (plotted).
Figure 5:
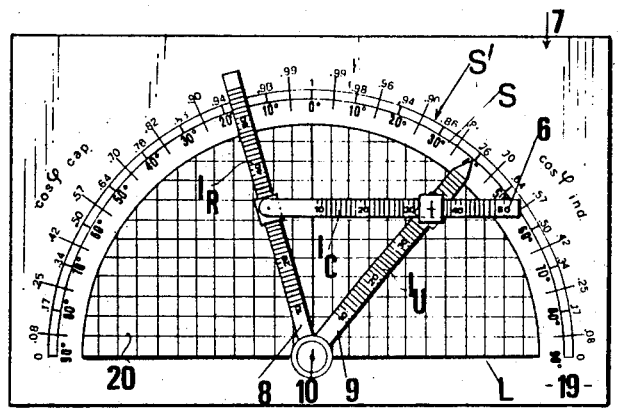
FIGS. 5 and 6 show to an enlarged scale the rule which is a component of the meter according to the invention as used for phase angle measurement when a capacitor is used (FIG. 5) and when a resistor is used (FIG. 6).
Figure 6:
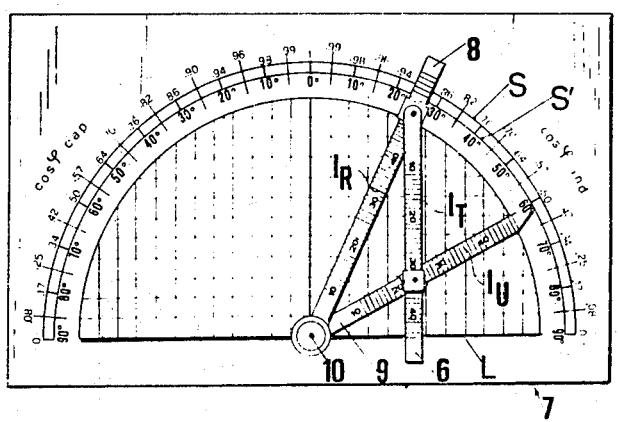

Referring to FIGS. 2, 5 and 6, two graduated hands 8–9 are each provided with a slider 8'–9' and are each pivoted at the centre 10 of a goniometeric scale, the base of which has been indicated by reference L. The scale S is goniometric as indicated and the scale S' is a related cos$\phi$ scale as indicated. A grid 20 is provided, the purpose of which will be explained later. The invention provides a graduated listel 6 provided with a fixed pin 6' and a movable pin 6'' which is integral with a slider sliding along the listel. The sliders 8' and 9' are each provided with a hole which can receive the pins 6' and 6'' respectively.

OPERATION

I : Measurement of the current $I_C$ by connecting the single capacitor 4 in the line Q, II : Measurement of the current $I_U$ by connecting the single load U.

III : Measurement of the current $I_R$ by connecting in parallel the capacitor 4 and the load U.

IV : Transferring the currents $I_C$, $I_U$, $I_R$ respectively to the slider of listel 6, the slider 9 and the slider 8 so as to obtain a triangle positioning and swinging the whole until the listel 6 is parallel to the base L. The tip of hand 9 will indicate on the scale S—S' the phase angle and the power factor value.

If in lieu of the capacitor 4, a pure resistor 3, namely a resistor having no reactance, is used, similar steps I, II and III are carried out whereby if $I_T$ is the current taken by the resistor 3, the currents $I_T$, $I_U$, $I_R$ are transferred respectively to the slider of listel 6, the slider 9, and the slider 8 so as to obtain a triangle positioning; if the whole is then swung until the listel 6 is perpendicular to the base L, the tip of hand 9 will indicate on the scale S—S' the phase angle and the power factor value.

The function of the two-way switch 2 will be obvious, and it will be apparent that the grid 20 will facilitate the positioning of the listel 6 so that it is perpendicular or parallel to the base L.

Figure 4:
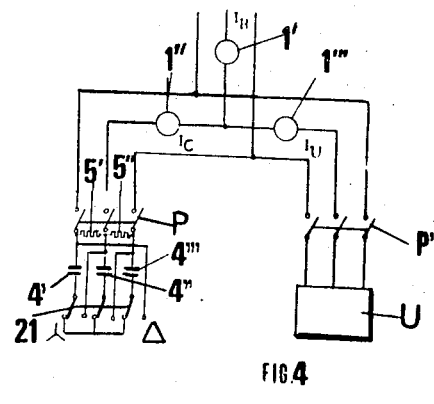
FIG. 4 shows how the invention may be applied to the measurement of the power factor for three-phase currents.

The diagram of FIG. 4 shows how the invention may be applied to the phase angle measurement for three-phase current, and balanced and symmetrical loads (U). References 1', 1'' and 1''' indicate ammeters for measuring the currents $I_R$, $I_C$ and $I_U$, references P—P' are two switches equivalent to those of FIG. 1, and references 4'-4''-4''' are three capacitors, the operation of which is the same as the capacitor 4. In order to connect the capacitor 4', 4'', 4''' to Y or delta a change-over switch 21 is provided.

The resistor 3 may be used even in cooperation with capacitor 4, but as a voltmeter resistance, so that the same ammeter, provided with an additional scale, can measure the line voltage, whereby the active, reactive and apparent powers can be measured.

I claim:

1. A phase angle meter for the indirect measurement of the power factor of a load characterized by the combination of current measuring circuitry and of a goniometric device, the measuring circuitry including an ammeter, a capacitor, a discharge resistor for the capacitor, two switches, the load of which the power factor has to be measured, the ammeter being connected by the said switches to measure the current $I_C$ taken by the said capacitor, the current $I_U$ taken by the said load, the current taken by the said load and capacitor when the capacitor and the load are connected with one another in parallel, the goniometric device including a goniometric scale, a first and a second graduated hand independently pivoted at the centre of the goniometric scale, each hand being provided with a slider indicating the corresponding graduation on the hand, a graduated listel being provided with a slider and cooperating with sliders of the said first and second hand, whereby by plotting by means of the listel and corresponding sliders the current $I_U$ taken by the load and capacitor in the slider of the second hand, and the current $I_c$ taken by the capacitor in the said listel by means of the listel slider, and swinging said first and second hand and listel so that the listel results parallel to the goniometric base, the said first hand on which the current load is plotted will indicate the phase angle on the said goniometric scale.

2. A phase angle meter for the indirect measurement of the power factor of a load characterized by the combination of current measuring circuitry and of a goniometric device, the measuring circuitry including an ammeter, a pure resistor, two switches, the load of which the power factor has to be measured, the ammeter being connected by the said switches to measure the current $I_T$ taken by the said pure resistor, the current $I_U$ taken by the said load, the current $I_R$ taken by the said load and pure resistor when the pure resistor and the load are connected with one another in parallel, the goniometric device including a goniometric scale, a first and a second graduated hand independently pivoted at the centre of the goniometric scale, each hand being provided with a slider indicating the corresponding graduation on the hand, a graduated listel being provided with a slider and cooperating with sliders of the said first and second hand, whereby by plotting by means of the listel and corresponding sliders the current $I_u$ taken by the load in the slider of the first hand, the current $I_R$ taken by the load and pure resistor in the slider of the second hand, and the current $I_T$ taken by the pure resistor in the said listel by means of the listel slider, and swinging said first and second hand and listel so that the listel results perpendicular to the goniometric base, the said first hand on which the current load is plotted will indicate the phase angle on the said goniometric scale.

* * * * *